Dec. 5, 1944.    J. E. HAILE, JR    2,364,070
AERIAL GUNNERY TRAINER
Filed July 30, 1943    5 Sheets-Sheet 1

INVENTOR
JAMES E. HAILE, JR.
By
ATTORNEYS

Dec. 5, 1944.                J. E. HAILE, JR                 2,364,070
                           AERIAL GUNNERY TRAINER
                   Filed July 30, 1943           5 Sheets-Sheet 2
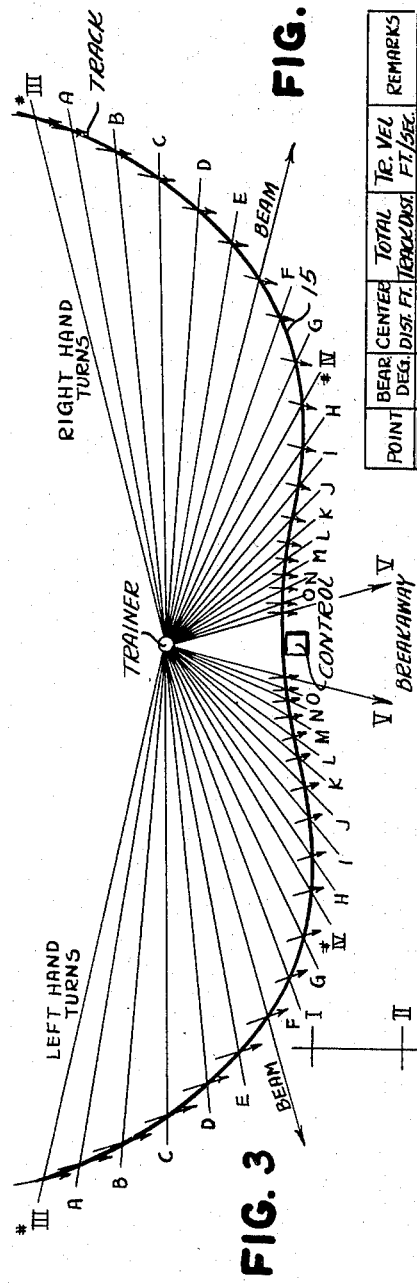
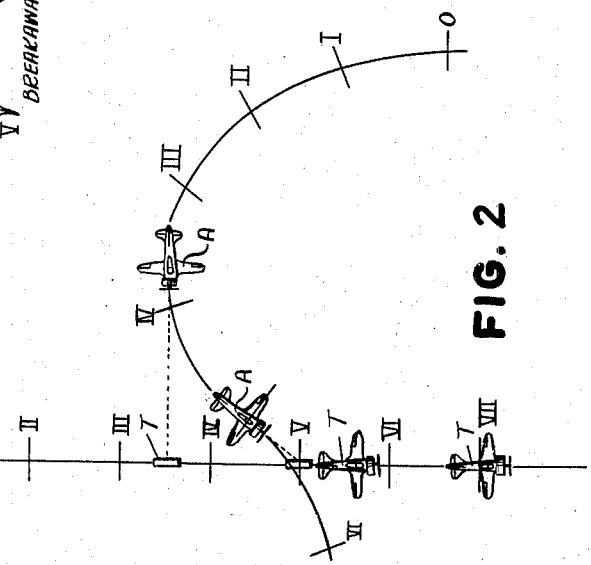
| POINT | BEAR. DEG. | CENTER DIST. FT. | TOTAL TRACK DIST. | TR. VEL FT./SEC. | REMARKS |
|---|---|---|---|---|---|
| #III | 62 | 636 |  |  |  |
| A | 65 | 612 |  |  |  |
| B | 70 | 580 | 0 | 60.0 |  |
| C | 75 | 548 | 160 | 52.0 |  |
| D | 80 | 516 |  |  |  |
| E | 85 | 480 | 326 | 36.0 |  |
| BEAM | 90 | 440 |  |  |  |
| F | 95 | 404 | 480 | 23.2 |  |
| G | 100 | 364 |  |  |  |
| #IV | 105 | 322 | 566 | 16.0 |  |
| H | 110 | 290 |  |  |  |
| I | 115 | 256 |  |  |  |
| J | 120 | 226 | 662 | 16.4 |  |
| K | 125 | 200 |  |  |  |
| L | 130 | 180 |  |  |  |
| M | 135 | 166 | 732 | 20.0 |  |
| N | 140 | 156 |  |  |  |
| O | 145 | 152 |  |  |  |
| *V | 150 | 150 | 768 |  |  |
| P |  | 146 |  |  |  |
INVENTOR
JAMES E. HAILE, JR.
By
ATTORNEYS

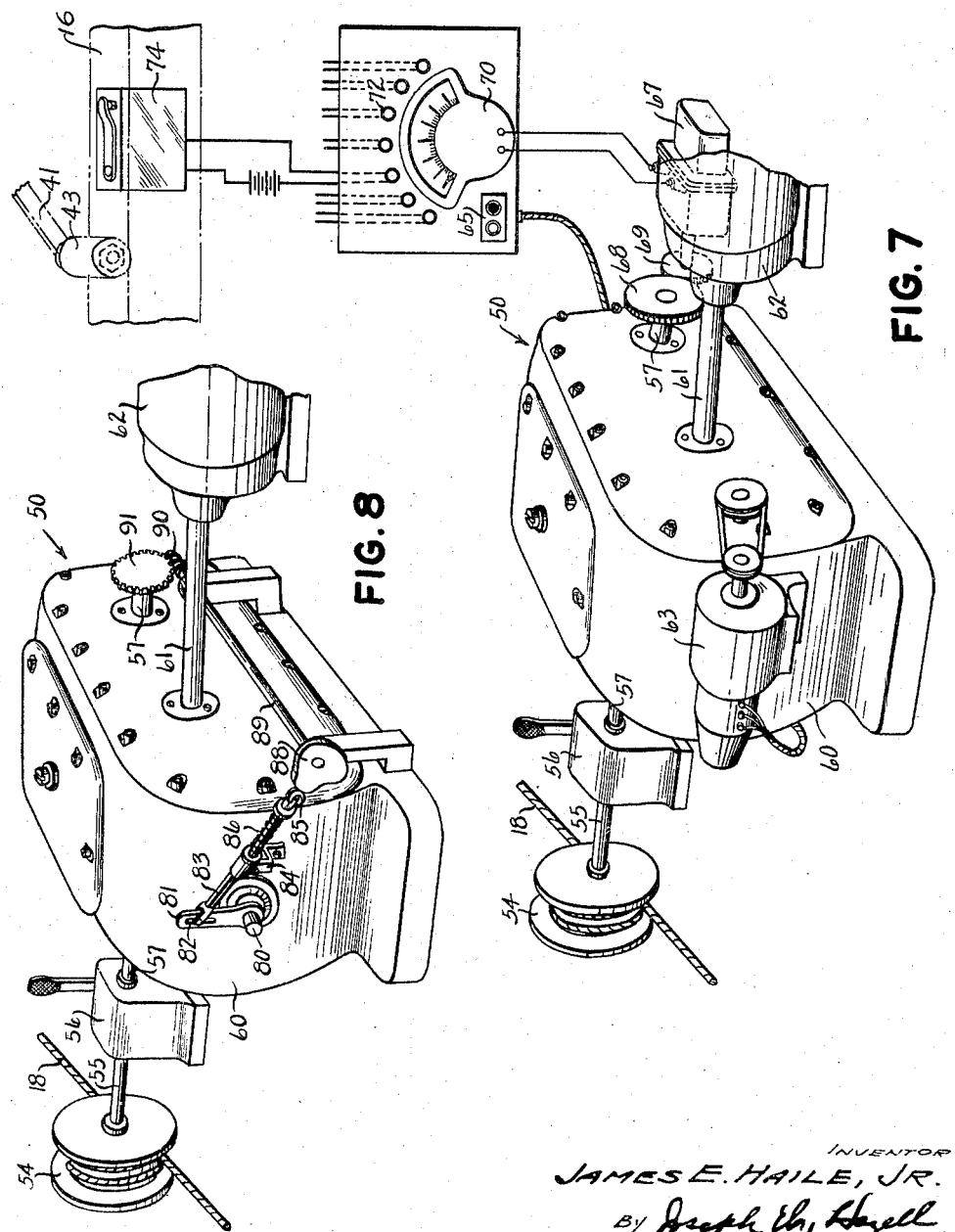

Patented Dec. 5, 1944

2,364,070

UNITED STATES PATENT OFFICE 2,364,070

AERIAL GUNNERY TRAINER

James E. Haile, Jr., Cedartown, Ga.

Application July 30, 1943, Serial No. 496,694

9 Claims. (Cl. 35—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved ground training device for instructing in the art of aerial gunnery and more particularly in the use of fixed type machine guns such as employed on fighter aircraft.

Current methods of instruction in training pilots in the use of fixed machine guns are primarily two in number: one, the use of the camera gun, and second, the firing at aerial tow targets. Each of these methods is satisfactory where the student has had sufficient training to acquire some skill, but are unsatisfactory in training large numbers of students because the time required to take off, climb to altitude, fire at the target, and land limits the number of instruction flights, and because of the expense involved. The camera gun is a complicated and expensive item of equipment, and the number of actual training flights which can be taken during the instruction period by each student is limited. The aerial tow target method of instruction has the disadvantage that the tow target must be disproportionately small in order not to impose a severe load on the towing airplane and lack of making hits discourages the student.

Many gunnery instructing devices have been proposed in the prior art, including trainers mounted for movements similar to the flight maneuvers of an airplane, the trainer being provided with fixed guns adapted to be fired at moving targets. The prior art proposals however have failed to take into consideration the problem of relative speed and orientation such as is presented in a combat attack on an enemy aircraft, and particularly these factors as related to range and size of the target.

In accordance with the present invention, a grounded trainer such as the well-known Link trainer, tiltable and rotatable about its base, is located on the firing range and supplied with power for operation under control of the student. One or more fixed machine guns fired by air using lead shot, or firing .22 calibre ammunition are mounted on the trainer, and the student must directionally control the trainer to aim the gun or guns at the target. A curved track is positioned at a predetermined range in front of the trainer and serves to support a power-propelled carriage which supports the target which is made so as to have an area proportional to the area presented by an enemy aircraft under assumed range conditions. The target is rotatably mounted on the carriage and adapted to be rotated by cam controlled mechanism to present different orientations with respect to the trainer as the carriage moves along the track. Means are also provided for varying the carriage speed throughout its travel. The arrangement is such that target area, range, velocity and orientation are such that the relative motion of the target represents in proportional scale the exact conditions encountered in a beam and quarter attack on an enemy aircraft. The data from which the track layout target velocity and other factors are computed to exactly simulate fighting conditions is derived from the average of the ground track of a number of simulated attacks by expert aerial gunners made in actual flight and recorded photographically.

The principal object of the present invention is the provision of a grounded training device for training fighter pilots in the use of fixed machine guns and simulating, in a reduced scale, factors such as range, relative speed, and size of the target and relative flight path so that firing conditions correspond exactly to conditions met in actual aerial combat.

It is a further object of the invention to provide in conjunction with a grounded trainer tiltable and rotatable about a base under the control of a student occupant, and having a machine gun mounted thereon, means for supporting a target for movement relative to the trainer in a curved path, means being provided for varying the target speed and orientation during its movement such that conditions of an attack on an enemy aircraft in reduced scale are exactly simulated.

Other features and objects of the invention not specifically enumerated above will appear by reference to the detailed description of the invention hereinafter given and to the appended drawings in which:

Fig. 2 is a diagram illustrating a beam and quarter attack on an enemy aircraft;

Fig. 3 is a diagram showing the necessary track curvature and target orientation at stations along the track to fulfill the conditions of the attack problem of Fig. 2;

Fig. 4 is a table of values of the target range or center distance, target orientation and target velocity at the various station points illustrated in Fig. 3;

Fig. 7 is a view illustrating the variable speed drive employed in propelling the target carriage; and Fig. 8 is a view similar to Fig. 7 illustrating a modified form of carriage drive in which the carriage track speed is automatically controlled.

Figure 1:
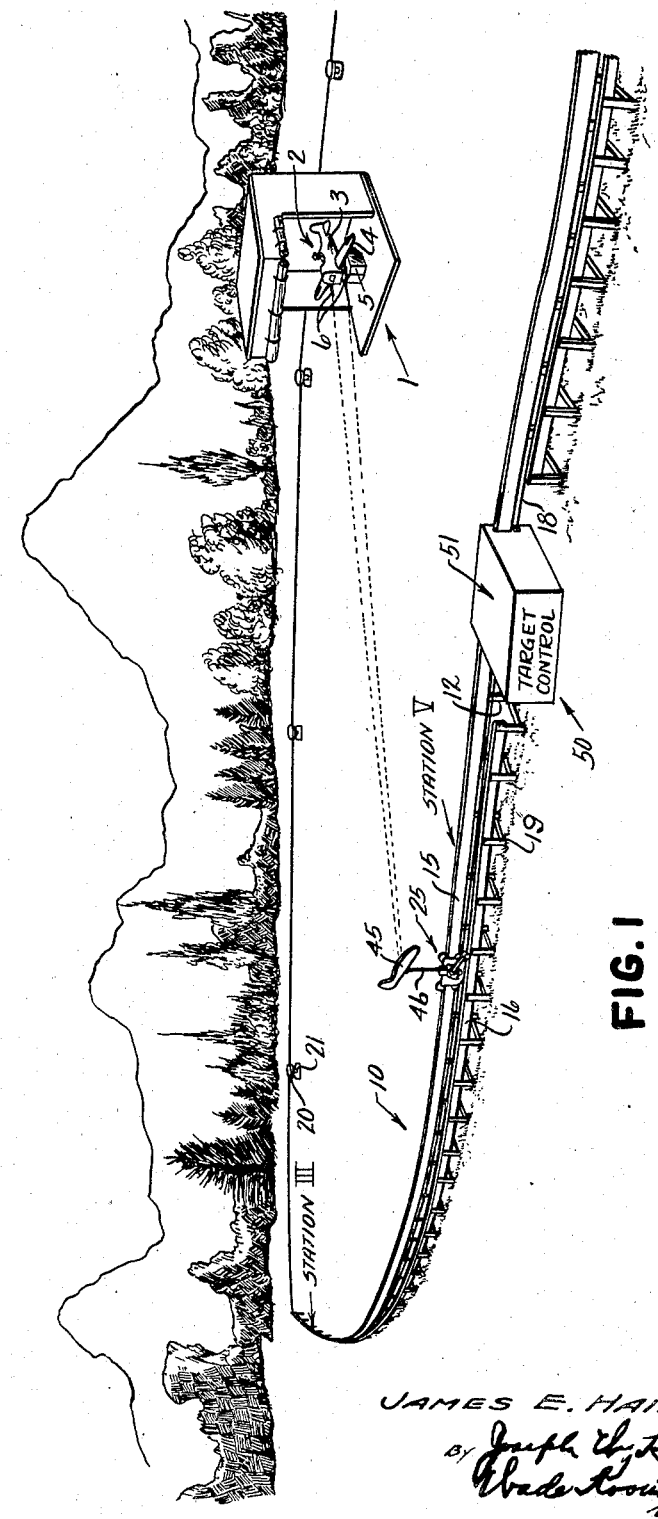
Fig. 1 is a perspective view of the arrangement of the elements of the invention.

Referring now to Fig. 1, the reference numeral 1 indicates an enclosure open on the front and sides, in which is positioned an aviation ground trainer generally indicated by the reference numeral 2 and preferably of the type known as the Link trainer, which is disclosed in United States Patents Nos. 1,825,462 and 2,099,857. The ground trainer 2 is provided with a fuselage 3 having dummy wings 4, the fuselage being tiltably and rotatably mounted on a base 5 and forming a cockpit enclosure for the student, who by manipulation of the controls may actuate power means for causing the trainer to tilt laterally or longitudinally, or to rotate in azimuth in a manner well known in the art to thus simulate the flight attitudes of an aircraft. A pair of machine guns 6 are rigidly mounted on the trainer wings 4 so that the trainer must be rotated in azimuth to point the guns. The guns are preferably either of the compressed air type, firing lead pellets, or .22 calibre machine guns, the firing of the guns being controlled in either case by a trigger mechanism mounted on the control stick or column of the trainer.

A curved track structure, the right half only being shown and generally indicated by the reference numeral 10, is positioned in front and to the sides of the trainer enclosure and is so designed that the range or center distance from the trainer to points on the track vary in a predetermined manner as will later be described. The track assembly 10 includes a wood rail 15, and a cam track 16 parallel therewith and laterally spaced therefrom. A cable 18 encircles the rail between its upper and lower edges, suitably supported by guiding rollers 20a, and extends beyond the ends of the track, passing behind the trainer enclosure 1 and being supported between the ends of the track by suitable guiding rollers 20 rotatably supported on vertical supports 21.

A pair of carriages (only one of which is shown), separated by substantially one half the total track length, generally indicated by the reference character 25, are mounted on the rail 15 by means of guide rollers 28, and the carriages are adapted to be propelled along the rail by the cable 18. Each carriage 25 is adapted to support a stem 46 upon which is mounted a target 45 simulating in outline the side elevation of a pursuit airplane and made to a predetermined scale such as one fifth full size. The description hereinafter given will be limited to the details of a single carriage and target, since they are operative one at a time only.

The target is adapted to vary its orientation from point to point as it is propelled along the track by rotation of the target by cam controlled means hereinafter to be described, and the target carriage cable is adapted to be driven by a reversible variable speed power means generally indicated by the reference numeral 50 which is operative either manually or automatically to vary the target velocity in a predetermined manner.

The particular type of attack problem to be simulated by the training device of the present invention is the beam and quarter attack illustrated in Fig. 2, in which the attacking airplane is indicated by the character A and the target airplane by the character T. Corresponding positions of the attacking and target airplanes are indicated by the same point numerals on the respective flight paths. Since enemy aircraft are generally encountered flying in the opposite direction from the attacking aircraft, such positions being for example as indicated at station points I, it is desirable for the attacking plane A to rake the enemy from nose to tail for maximum effectiveness, so accordingly the airplane A executes a turn and would commence fire at about point III, firing broadside between points III and IV, and firing in the rear quarter at point V, and shortly thereafter ceasing fire as the flight paths intersect at the point of breakaway, the attacker proceeding along the paths to point VI. It will be noted that the relative speeds are greatest at points I, and least at the point of breakaway, and the relative bearing of the target with respect to the attacker A is continuously changing, and the attacking airplane must be sharply banked in a turn during the time of firing. By photographing the ground track made by a number of different expert fighter pilots in mock combat, an average flight path was determined, which would truly represent actual conditions. From the average flight path as above determined, and knowing the range of the target, relative speeds, and relative bearings, it was possible to translate such data into the requirements of the training device. Since the problem of Fig. 2 involves the relative motion of two aircraft, the relative motion may be simulated by firing guns mounted on a rotatable grounded trainer at a relatively moving target. In order to duplicate exactly to a reduced scale the conditions of attack as outlined above, the range of the target at every point in its path must agree in reduced scale to the range at corresponding points in the flight pattern of the attack to be simulated and the target velocity in scale must vary so as to represent the relative velocity of the aircraft in the assumed attack of Fig. 2, these two factors determining the contour of the target path relative to the trainer. Further, the orientation of the target must at any instant correspond to the orientation of the target airplane T relative to the attacking airplane A in accordance with the conditions of the problem of Fig. 2.

*The track*

The track on which the target carriage runs, and which determines the target path relative to the trainer, is laid out as illustrated in Fig. 3. In determining this layout a reduction scale is chosen, selected mainly by comparison of the effective range of the gun to be used on the trainer to the range of the guns on the actual airplane. From the conditions of the combat problem as determined from known practice as outlined above, the total angle of turn of the trainer is determined, which determines the radial lines passing through the terminal points of the assumed attack such as points III and V, Fig. 3. By calculation of the target range for equal intervals of time in the attack problem, the corresponding range can be laid off on the equiangularly spaced radial lines between the station points III and V, and a smooth curve joining the range points on the radial lines gives the necessary track contour. The track curves are similar for the right and left portions, and this arrangement permits firing from the trainer in either right- or left-hand turns to simulate a corresponding type of attack. To complete the simulation of an actual attack it is necessary that the target velocity vary in scale from point to point along the track in a manner representing the relative velocity of the target airplane with respect to attacking airplane in the attack problem of Fig. 2, and further the target orientation must vary in the same manner as the change in bearing of the target airplane with respect to the attacking airplane. The means for varying target velocity and orientation will be later described. The various data relating to the range or center distance from the axis of rotation of the trainer to each track station, the distance along the track between station points and an origin, target velocity at selected station points, and target orientation or bearing with respect to the radial line drawn through each station point are all tabulated in the table, Fig. 4, and give the necessary data for a training device employing .22 calibre guns. The relations to satisfy the conditions of the problem of Fig. 2 are primarily concerned with relative positions and velocities of the target and attacking aircraft, and therefore the trainer can represent a large number of possible airplane attacks wherein relative conditions are substantially the same.

Figure 5:
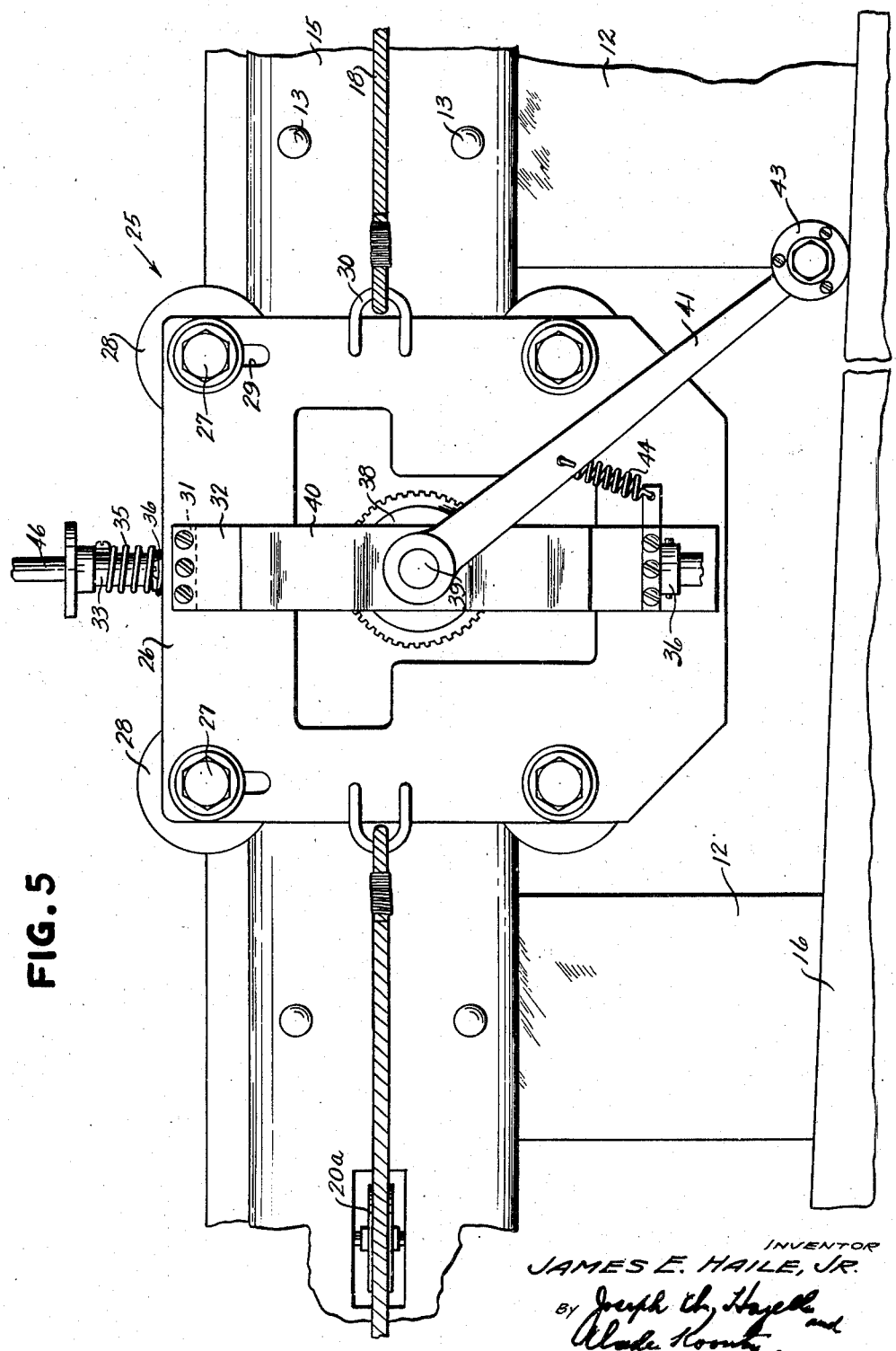
Fig. 5 is a side elevation of the target carriage showing the same mounted on the track.
Figure 6:
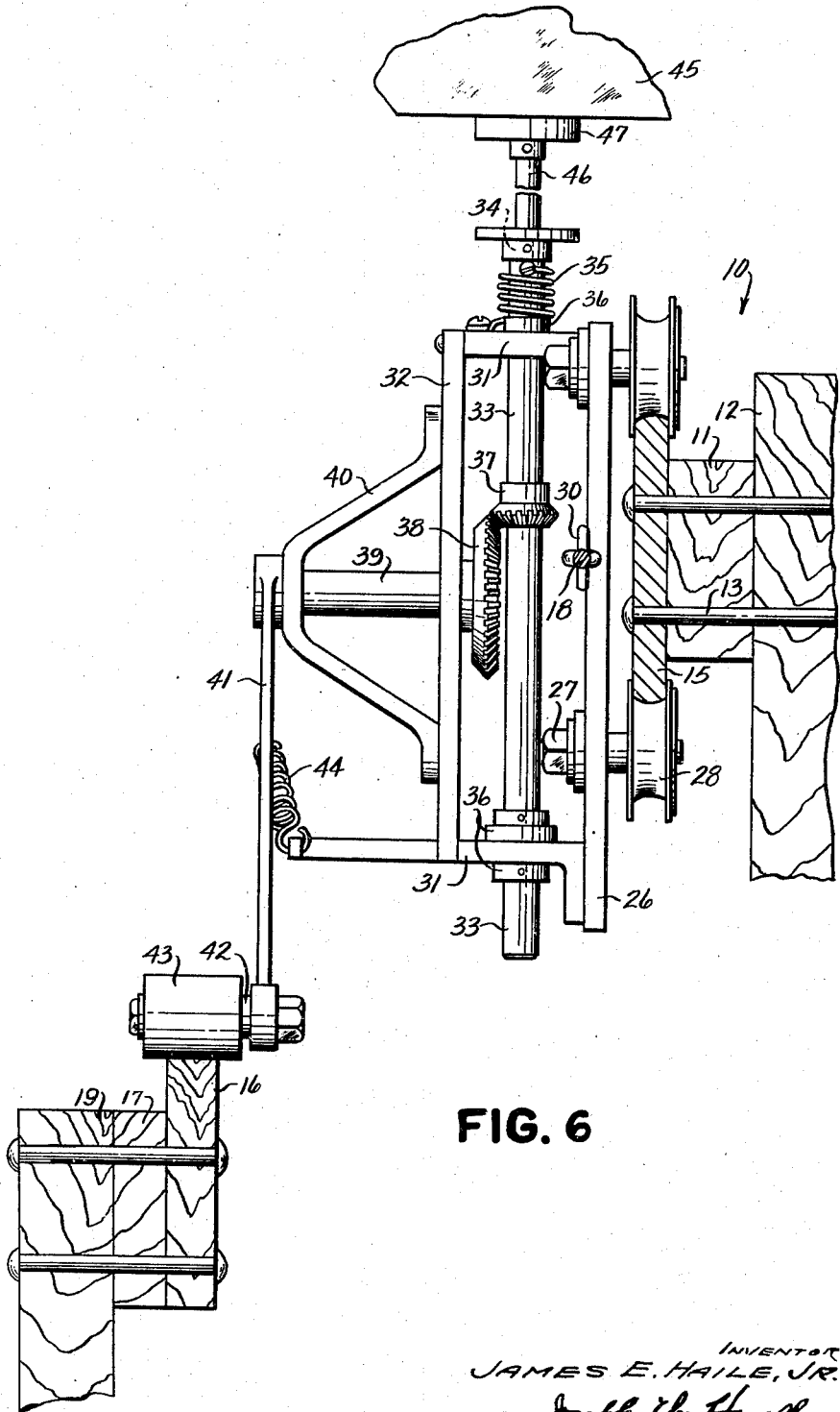
Fig. 6 is an end view of the carriage illustrated in Fig. 5.

The actual track 15 is made so that it extends beyond points III (Fig. 3) to allow for target acceleration and corresponds in planform to the outline of Fig. 3 and the rail 15 of Fig. 1, made of hard maple, is secured to a backing strip 11 and vertical supporting posts 12 by rivets 13 (see Figs. 5 and 6). A cam 16 made of wood and extending in a plane parallel with the track 15 is secured to a backing strip 17 (see Fig. 6) and supported by vertical posts 19 which are braced to posts 12 (Fig. 1).

The target and target carriage

The target carriage generally indicated by reference numeral 25 (Fig. 1), as seen in Figs. 5 and 6, comprises a main plate or frame member 26 to which four roller spindles 27 are rigidly secured adjacent the respective corners of the frame member. A grooved roller 28 provided with a central ball bearing is mounted on each of the spindles 27. The rollers 28 engage the upper and lower sides of the track 15 and provide for movement of the carriage therealong, the upper pair of spindles 27 being adjustable in slots 29 in the frame member 26 to provide roller adjustment. Rings 30 welded to the frame member 26 serve as anchorages for the driving cable 18. Bearing plate members 31 extend rearwardly from the frame 26 and are interconnected by a plate 32. A shaft 33 is rotatably journalled by bearing plates 31 and is bored as at 34 to receive the target supporting rod 46, which at its upper end is provided with a boss 47 to which the target 45 is secured (see Fig. 6). The shaft 33 is biased by a torsion spring 35 and is maintained in assembled relation by removable thrust collars 36. Intermediate its ends the shaft 33 is provided with a bevel-toothed pinion gear 37 which meshes with a large bevel gear 38 secured on the inner end of a shaft 39 rotatably journalled in bearings in plate 32 and bracket 40 secured thereto. A lever 41 is secured to the outer end of shaft 39 and has a spindle 42 secured to its outer end on which a ball bearing roller 43 is mounted. The roller 43 is adapted to engage the upper surface of the cam track 16 and is maintained in contact therewith by means of a tension spring 44 connected to the lever 41 and attached to the carriage frame.

As previously discussed, the target 45 must change its orientation from station III to station V (see Fig. 3) and by reference to the table (Fig. 4) the total change in bearing between these stations is equal to eighty-eight degrees, and the change is such that the target must rotate in a clockwise sense viewed from above for the right-hand turn portion of the track which requires a similar rotation of the support rod 46 and shaft 33 as the target progresses from station III to station V, so that for this half of the track assembly the cam track must decrease in height so the cam roller 43 will move down and cause a rotation of arm 41, shaft 39, and gears 38 and 37, to rotate shaft 33 in a clockwise sense. The slope of the cam track 16 must be such between station points that the target bearing will be the desired value at each station. For the left-hand turn portion of the track assembly the slope of the cam track will be reversed, i. e., the height of the cam track will be least at station III and greatest at station V, thereby causing counterclockwise rotation of the target as seen from above. The change in slope between stations will be of the same amount as between corresponding points on the other half of the track. The cam track slope is illustrated to an exaggerated degree in Fig. 5.

The target driving mechanism

As previously discussed with reference to Figs. 1 to 4, it was noted that the target must vary in velocity as it moves from station point 3 to station 5 on either half of the track in order to comply with the conditions of the problem stated in connection with Fig. 2. The variable speed drive generally indicated by the reference numeral 50 in Fig. 1 is accomplished by leading the cable 18 over suitable guide pulleys (not shown) positioned within the operating enclosure 51 at the center of the track (see Fig. 1), and within which the driving mechanism, which may be of either of two forms such as illustrated respectively in Figs. 7 and 8, is placed.

Referring to Fig. 7, the cable 18 is seen to be wound around a cable drum 54 which is mounted on a shaft 55, which in turn is adapted to be clutched through a conventional bevel gear reversing drive 56 to a driving shaft 57 of a conventional variable speed drive unit 60 which may be, for example, of the type manufactured by the Link Belt Co. and known as the P. I. V. gear which gives infinite variation in speed between predetermined limits. The gear 60 is provided with an input shaft 61 driven by an electric motor 62 which may be started and stopped at will and preferably provided with a brake means (not shown) operable when the motor is stopped to brake the driving mechanism. The variable speed gear is adapted to have its driving ratio varied by means of an electrical servomotor 63 which is reversible and selectively caused to operate in either direction by pressing one of the buttons of the control switch 65 to thereby cause the variable speed drive to increase or decrease the speed of rotation of the cable drum 54. An electric tachometer generator 67 is driven by means of gears 68 and 69 from an extension of the output shaft 57 of the variable speed gear 60, and the generator in turn is electrically connected to an indicating instrument such as a voltmeter 70 which has its scale calibrated in terms of target velocity. Signal lamps 72, each of a different color, may be arranged radially with respect to the axis of rotation of the voltmeter pointer so that the lamps which correspond to certain track station points will be on the radial line passing through the correct speed value for that station. The signal lamps 72 may be successively operated by switches such as 74 mounted in the cam rail 16 at the respective track stations and sequentially actuated by the cam roller 43 of the carriage 25 as it passes the track station points.

The lamp switches at the corresponding right and left track stations are connected selectively to the corresponding signal lamps by switch means (not shown) which may for example be operated in unison with the reversing gear 56.

The arrangement of Fig. 8 is identical with that of Fig. 7 with the exception that the speed variation is automatic and in this arrangement the electric servomotor 63 of Fig. 7 is replaced by a shaft 80, rotation of which is effective to change the speed setting of the variable speed drive 60, and which can be furnished as a part thereof, the shaft 80 being rotated by a lever 81 which is slotted at its upper end as at 82 to permit actuation of the lever by the push rod 83 which passes through a stationary guide 84 and is provided with a cam follower roller 85 at its outer end and a compression spring 86 keeping the cam follower in contact with a cam 88. The cam 88 is driven by a shaft 89, which in turn is driven by worm gearing 90 and 91 from an extension of the output shaft 57 of the variable speed driving unit 60. The cam 88 since it is driven in unison with the drum 54, will move in proportion to the movement of the target carriage, and the cam contour is so made that the speed ratio control lever 81 and shaft 80 are moved to vary the target speed in the required amount.

*Operation*

As previously noted with respect to the description of Fig. 1, two target carriages 25 are employed, spaced approximately one-half of the total track length apart so that as one carriage is moving from point III to point V on one-half of the track (Fig. 3), the other target is moving in a reverse direction so that upon completion of firing from a right-hand turn the student can start firing from a left-hand turn, the target drive being reversed between the firing intervals. The track assembly 10 (Fig. 1) is constructed so that it extends to the rear of the first firing point station III an amount sufficient to permit acceleration of the target to full speed by the time it appears within the field of fire.

When the training device is placed in operation the student takes his place in the trainer 2 (Fig. 1), places the trainer in operation, and swings the trainer in the direction of station III, it being presumed that the target carriage 25 is positioned at the outer end of the track beyond station III. An operator positioned in the driving mechanism enclosure 51 (Fig. 1) clutches in the reversing gear 56 (Fig. 7) so as to drive the target carriage in the right direction, energizes the driving motor 62 and also servomotor 63 by pressing the fast button of control switch 65 so that the cable drum 54 is quickly accelerated to its predetermined maximum speed, and the carriage 25 will appear to the student in the trainer shortly prior to arriving at station III (Fig. 1). The student then causes the trainer to bank and make a left-hand turn, the degree of bank varying in the turn, and starts to fire at the target. The operator in the enclosure 51 watches the signal lights 72 (Fig. 7) and when the signal lamp for station 3 is illuminated, the operator, through control of the servomotor 63 by push button control 65, causes the variable speed drive speed reduction ratio to increase so that the speed of the target carriage 25 will progressively decrease. The operator so varies the speed that the pointer of the tachometer indicator 70 (Fig. 7) will be pointing to the proper signal light when the same is illuminated by the closing of the corresponding carriage operated switch 74. The operation of the mechanism of Fig. 8 is identical to that as above described with the exception that the speed reduction is performed automatically rather than by manual control, since, as described above with respect to Fig. 8, the cam 88 is driven so that it makes one revolution for a complete traverse of the target carriage and is so shaped that, through the action of cam follower 85, the speed control lever 81 of the variable speed drive unit is automatically adjusted to give the required driving speed to the carriage 25 at each point in its travel.

As the target carriage progresses from station III toward station V in the left-hand turn half of the track (Fig. 1), the target orientation will vary as indicated by the arrows in Fig. 3 due to the action of the cam track 16 in displacing roller 43 and arm 41, causing rotation of shaft 33, which in turn causes rotation of the target 45 (see Fig. 6). The target is fired on in the front quarter beginning at station III, presents a beam shot at the station so indicated, and is fired on from the rear quarter until station V, the point of breakaway, is reached (see Fig. 3), so that the student has a period of only about 12 seconds in which to effectively fire. The target material is made such that any hits made by the student will indent or pierce the target for scoring purposes.

While one target is being fired upon, the second target carriage 25 is moving to the starting point on the other half of the track so that when the target being fired upon passes the breakaway point, the speed can be manually or automatically reduced so that the carriage will be substantially stopped prior to reaching the enclosure 51 (Fig. 1), the operator then stopping the driving motor 62 and declutching the reversing gear 56 (Fig. 7) and reversing the same in readiness to repeat the procedure employing the second target carriage.

After firing at one target in a left-hand turn, the student may then turn the trainer and fire at the second target in a right-hand turn, the target advancing from station III to station V on the right-hand turn portion of the track as indicated in Fig. 3. The second target carriage is placed in operation in the same manner as previously described, and, due to the fact that no appreciable time is lost between firing periods, each student can fire as much as twenty times the ammunition which could be fired in an actual airplane at tow targets.

Since the operation of the trainer requires the same manipulation of the controls as in actual flight and all other factors are proportionately scaled to actual combat conditions, the student as soon as he makes hits will gain confidence and, due to the increased number of passes at the target which can be made, will have more opportunity to correct errors; and the instructor has more opportunity to study the individual student and render advice. The training course may constitute a predetermined number of passes at the target spread over a number of firing periods, and at the completion of the course further instruction may be given in aircraft firing at tow targets or using the camera gun, with the certainty that the student will make much better scores than without the ground training instruction.

It should be understood that in place of the variable speed cable drive, an electric motor mounted directly on the carriage and fed from trolley conductors might be employed, the motor speed being controlled by variation of the voltage of the current supplied to the motor, the voltage being regulated manually or automatically by a rheostat.

While the track structure as above described has been in reference to the use with machine guns of .22 calibre, the track outline is similar when employing compressed air machine guns firing lead ball shot, except that the center distance of the stations on the track will be less due to the smaller range and muzzle velocity of the air gun, the ratio of air gun center distance to .22 calibre center distance at corresponding stations being approximately in the ratio of 3 to 8.

While a preferred form of the invention has been illustrated and described, various changes and modifications thereof will be apparent to those skilled in the art as falling within the scope of the invention as defined in the appended claims.

I claim:

1. In an aerial gunnery instructing device of the character wherein a grounded platform forming a fixed machine gun support is tiltable and rotatable through the actuation of power control means by a student seated on the platform to simulate the flight attitudes of an airplane, and the machine guns are adapted to be fired under control of the student at a moving target remote from the gun platform, the improvement which comprises a curved track positioned within the zone of fire of the gun on said platform, the curve of the track being such that the radial distance of each point on the track from the axis of rotation of said platform represents in a fixed scale the corresponding distance in the ground pattern of an assumed fighter airplane quarter and beam attach on a target airplane, a target supported for movement on said track, means for propelling said target at a variable velocity along the track corresponding in a predetermined scale to the relative velocity of the assumed attacking and target airplanes, and means for varying the orientation of the target with respect to the line of fire from said gun platform as the target moves in a given direction along the track to thereby represent the corresponding change in bearing of the assumed target airplane with respect to the assumed attacking airplane.

2. The structure as claimed in claim 1, in which the target movable along the track has an area proportioned to the side elevation area of a full sized airplane in accordance with the scale of said track as related to the assumed ground pattern.

3. The structure as claimed in claim 1, in which said target is rotatably mounted on a carriage supported on rollers engaging said track, said target mounting permitting a predetermined rotation of said target in azimuth, means mounted on said carriage for rotating said target and cam means operatively connected to said last-named means for varying the target orientation in a predetermined manner as the carriage moves in a given direction between certain station points on said track.

4. The structure as claimed in claim 1, including a carriage movable on said track, means on said carriage for supporting said target for rotation in azimuth, means associated with said carriage and including a cam follower for causing rotation of said target and a cam track paralleling said carriage supporting track and engaged by said cam follower for automatically and continuously varying the orientation of the target as the carriage moves along the track in a given direction.

5. The structure as claimed in claim 1, including a carriage movable on said track for supporting said target, a variable speed power means for propelling said carriage, manually controlled means for varying the speed of said power means, speed indicating means for indicating the instant speed of the carriage, and signal means operated by the carriage for corelating carriage position on said track with the speed indicating means.

6. The structure as claimed in claim 1, in which the target is mounted on a carriage supported for movement on said track, a variable speed driving means for said carriage, and means operable in accordance with the position of said carriage from a fixed reference station on said track for varying the speed setting of said variable speed driving means.

7. The structure as claimed in claim 1, in which the target is mounted on a carriage supported for movement on said track, a variable speed power means for driving said carriage, and means automatically operable by movement of said carriage between predetermined station points on said track for varying the speed setting of said variable speed power means.

8. An aerial gunnery training device for simulating conditions on the ground of an assumed quarter and beam attack on a target aircraft in aerial combat, comprising a gun platform tiltable and rotatable about a fixed base under the control of a student seated on said platform, to simulate the flight attitudes of an attacking aircraft, a machine gun mounted on said platform, a curved track positioned in the zone of fire of said gun and having a curvature such that the range at each point corresponds in a predetermined scale to the range of the assumed target aircraft in the corresponding ground track of the assumed aerial combat, a target carriage mounted on said track, a target mounted on said carriage for movement in azimuth, variable speed power means operatively connected to said carriage for propelling the same at a variable speed along said track, and means associated with said carriage for rotating said target including a cam follower and a cam track parallel with said carriage track cooperating with said cam follower to continuously vary the orientation of said target with respect to a radial line joining said carriage and the axis of rotation of said gun platform so that the target orientation at any point in the movement of the carriage along the track corresponds to the relative bearing of the said assumed target aircraft with respect to the assumed attacking aircraft.

9. In a gunnery training device, a machine gun mounted for movement in azimuth, a track positioned within the zone of fire of said gun, said track having a curvature with respect to the axis of rotation of the gun such that its range at any point corresponds in a reduced scale to the range of an assumed tarket airplane in a theoretical aerial combat, a target having an area proportioned in accordance with the track scale to the side elevation area of the assumed target airplane, means mounted on said track for supporting said target, means for propelling said target at a continually varying speed from one end of said track to the other, and means responsive to the change in position of said target supporting means from an initial fixed reference position on said track for continuously varying the orientation of the target in azimuth with respect to the line of fire from said gun.

JAMES E. HAILE, Jr.